July 3, 1956 F. C. SCHWANEKE 2,753,436
COOKING UTENSIL
Filed Oct. 1, 1952 4 Sheets-Sheet 1

INVENTOR.
Fred C. Schwaneke
BY
Atty.

July 3, 1956 — F. C. SCHWANEKE — 2,753,436
COOKING UTENSIL
Filed Oct. 1, 1952 — 4 Sheets-Sheet 2

INVENTOR.
Fred C. Schwaneke
BY
Watson D. Harbaugh
atty.

July 3, 1956  F. C. SCHWANEKE  2,753,436
COOKING UTENSIL
Filed Oct. 1, 1952  4 Sheets-Sheet 3

INVENTOR.
Fred C. Schwaneke
BY
*Ivarson D Harhaugh*
atty.

July 3, 1956
F. C. SCHWANEKE
2,753,436
COOKING UTENSIL
Filed Oct. 1, 1952
4 Sheets-Sheet 4
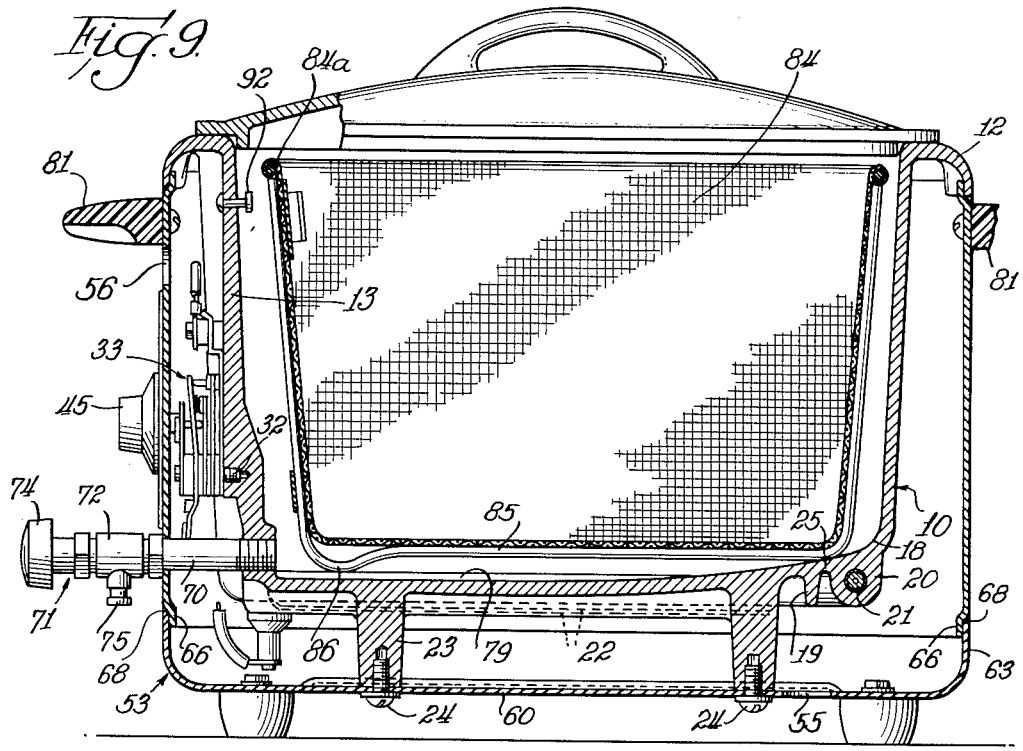
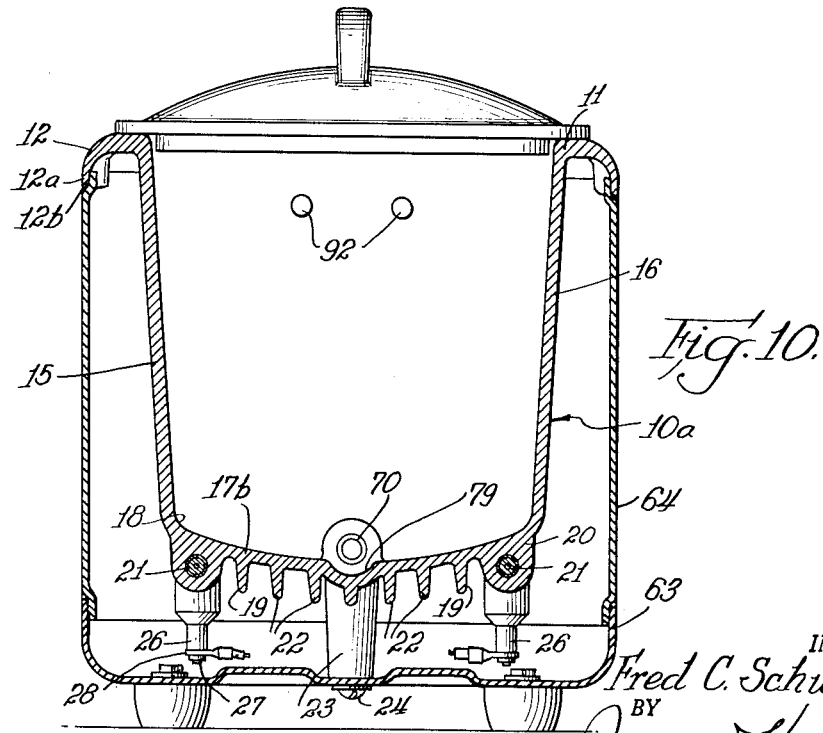
INVENTOR.
Fred C. Schwaneke
BY
Watson D. Harbaugh
Atty

United States Patent Office 2,753,436
Patented July 3, 1956

2,753,436

COOKING UTENSIL

Fred C. Schwaneke, Chicago, Ill., assignor to Dormeyer Corporation, Chicago, Ill., a corporation of Illinois Application October 1, 1952, Serial No. 312,453

7 Claims. (Cl. 219—44)

This invention relates to cooking utensils generally and more particularly to a device for cooking food in hot oils, fats or water, and often referred to as a deep fat fryer.

A great deal of difficulty has been experienced with deep fat fryers in maintaining an even temperature in the fat regardless of whether or not it is operating under "loaded" or "standby" conditions so that cooking times and results can be standardized for different foods and recipes followed to the letter with resultant uniformity of operation. Either the devices are very slow to return the hot fat to its working temperature when cooled down by a load of cold food, or the temperature of the fat varies over a wide range when the device is capable of quick recovery and is operating upon "standby" service.

Furthermore, for one reason or another deep fat fryers employing the principle of a cold well fail to utilize the full volume capacity of the fat in the vessel. The fat in the cold well is never displaced by food volume. Cooking capacity is thereby lost and delays incurred because of necessary multiplication of cooking periods. Otherwise, a larger vessel is required to cook such a food capacity under normally expected operations with a predetermined volume of fat.

Given a predetermined volume of fat with which to work, such as three or four pounds, and a wattage limitation of approximately 1350 watts prescribed for "plug-in" household or restaurant appliances, one of the objects of the invention is to provide a deep fat fryer which maintains a substantially constant temperature for a maximum food capacity in the maximum well space available in a vessel of a predetermined horizontal cross-sectional configuration and with a minimum quantity of fat.

Another object of the invention is to provide an improved electric deep fat fryer which provides a greater ratio between the space occupied by the grease when fully loaded and the space occupied by the grease during standby operation.

A further object of the invention is to provide a deep fat fryer in which a maximum level of the grease under fully loaded condition is higher than heretofore attained for a given volume of grease above its "no load" level to augment convective circulation of the hot fat under loaded conditions above that normally present with conventional deep fat fryers.

A further object of the invention is to provide a greater cooking space above the heater level for a given amount of fat than heretofore provided in conventional deep fat fryers.

Another object of the invention is to provide a cooking vessel of the class described in which the lowermost limit of an applied load is closely proximate to the bottom of the vessel and the upper level of the heating element.

A further object of the invention is to create and dispose a concentration of heat at one end of an elongated vessel remote from a thermostat so that the higher heat exchange relationship at that end will force the circulation of the coolest portion of the hot fat into contact with the wall where the thermostat is located under conditions in which a cooking load occupies substantially the entire volume of the hot fat in the frying well.

A further object of the invention is to accelerate the response of the thermostat on a full capacity deep frying well in the direction of its next critical position in its cycle of operation to thereby anticipate any over-run effect of an electric heater upon the vessel and the hot oil displaced to its fullest capacity.

A further object of the invention is to provide a cooking oil or fat handling device which settles out sediment while being drained to permit the repeated use of the oils or fats cleaned thereby without detracting in any way from the maximum use of the fat volume in the cooking well with a partial or a full load.

A further object of the invention is to induce the chilling or the maintenance of a cool portion limited to the central portion of the bottom of the well to assist in a convective circulation of the fat in the well from a thermostat influencing position to the heating area of the bottom of the well adjacent to the side walls to induce and maintain a convective circulation of the hot fat and heated fat which brings the heated fat into intimate and rapid contact with the cooking load, and the fat cooled by the cooking load into intimate and immediate heat exchange relationship with that portion of the vessel which influences the action of the thermostat for the control of the application of the heat to the fat.

A further object of the invention is to provide a cooking oil or fat handling device which permits intimate closeness between the walls of the food carrying basket and the walls of the deep fat frying well throughout the sides and bottom.

A further object of the invention is to provide a deep fat frying well construction with which a minimum packaged amount of fat can be employed to cook in a lesser time with complete uniformity a greater food load than heretofore possible with the same amount of fat.

Other objects of the invention include the construction and arrangement of parts which are easy to keep clean, simple and inexpensive to manufacture and service, easy and efficient in operation and capable of complete understanding thereof merely from observation by users not skilled mechanically, further objects being apparent from the drawings, the description relating thereto, and the appended claims.

Referring to the drawings generally:

Fig. 9 is a view similar to Fig. 2 embodying the casting shown in Fig. 8; and

Figure 1:
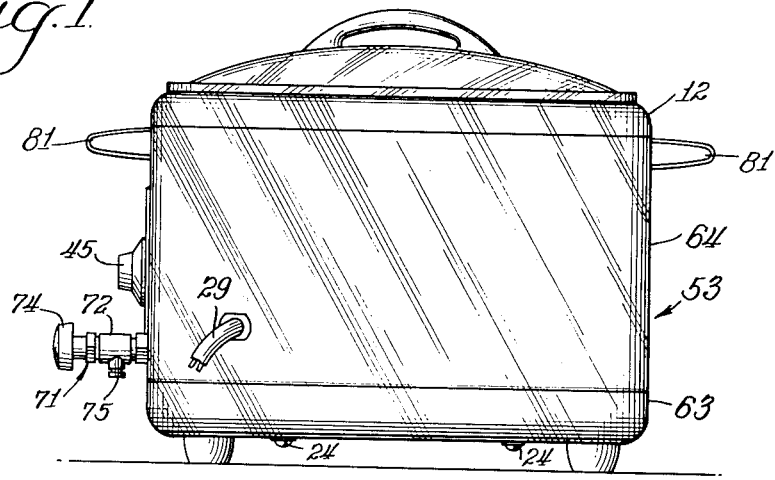
Fig. 1 is a side elevation of a cooking device embodying the invention.
Figure 8:
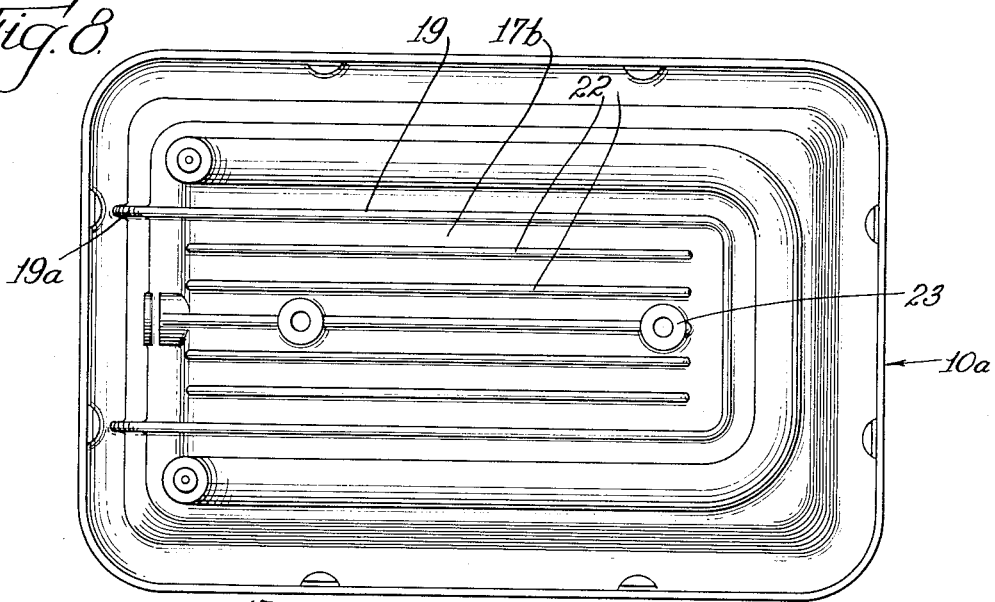
Fig. 8 is a bottom view of a modification of the frying well casting embodying the invention.

Fig. 10 is an enlarged sectional view similar to Fig. 3 showing the modification shown in Fig. 8 assembled in a device similar to that shown in Fig. 1.

Throughout the several views like numbers refer to like parts.

Referring now to the drawings in further detail, the present invention is characterized by the elimination of the so-called cold well of reduced horizontal cross-sectional area heretofore used in the bottoms of deep fat fryers for the collection of sediment and particles of food dropped from food being cooked. The bottom wall of the frying well in the present invention is of full length and width. These cold wells generally employed heretofore are of a size limited to the distances between the heater elements, which in turn are offset inwardly from the sides of the vessel and are filled with a substantial quantity of fat which is never displaced by a cooking load. Thus the upper level of the hot fat or the cooking capacity is restricted materially because of this loss of displacement with a cooking load.

In the present invention the bottom wall of the frying well is of full length and width to provide maximum cooking capacity generally associated with flat bottom vessels. The central section of the bottom portion, however, is kept cool by heat barrier fins or heat radiating flanges bordering the heater and depending from the lower face of the bottom wall at distances spaced inwardly from the heater and extending preferably up the end wall on opposite sides of the bimetal thermostat to minimize the conduction of heat from the heater into the wall area bounded by the flange. Thus, any heat conducted along the bottom wall of the vessel or the end wall of the vessel through the metal thereof from the heater which is not taken up by the fat is dissipated through the radiating fin with very little of it remaining to find its way to the center portion of the bottom wall. Thus the bottom wall is as cool as the coolest portion of the fat. This is true also of the end wall disposed between the vertical portions of the fins on the end wall. This relationship will be better understood when it is appreciated that the embodiment of the invention contemplates a substantially rectangular aluminum die-cast vessel with an extra mass of depending metal stock bounding three sides of the bottom wall of the vessel. A "Cal-rod" or "Mono-rod" type electric heater is embedded in this stock at the time the vessel body is cast. The heater is U-shaped and where the bends therein coincide with two adjacent corners of the vessel there is less metal stock at these points per lineal unit of heater length so that a higher heat application is concentrated at these points and in the wall between them than over the remaining portion of the heater.

This concentration of heat forces convective circulation of cooled fat down along the wall remote therefrom where a thermostat is mounted on the outside as disposed in an air space where it responds to heat radiated from the wall as well as heat conducted through limited metal contact from the wall. More particularly, the thermostat is an adjustable one and can be any one of a number of conventional constructions provided the bimetal member is disposed proximate to the vessel wall and at its mounted end is placed in metal contact heat-conducting relationship with the vessel wall.

Above the thermostat, where the infra red rays thereof may strike the bimetal edgewise, is preferably located a bare wire glow coil connected in series with the heater. This coil causes the thermostat to anticipate the heating and cooling off effect of the heater and vessel respectively, and in conjunction with a cover of low heat-conductivity, maintains the temperature of the fat in the vessel at a substantially constant level.

A drain through the end wall permits removal of the hot fat from a cool area where the liquid is comparatively quiet and any foreign particles in the cooling oil will settle out.

More particularly the vessel comprises a unitary casting 10 preferably made of die-cast aluminum. The upper edges 11 are flanged outwardly and downwardly as at 12 to terminate in an edge 12a and a bottom face 12b comprising the parting line of the die. The vertical walls 13, 14, 15 and 16 which comprise the front end wall, the back end wall, and the side walls, respectively, are preferably made of cast metal thicknesses as shown in the several views and converge in a downwardly direction, being so inclined on their inside and outside faces as to provide draw tolerances for the forming dies.

Figure 2:
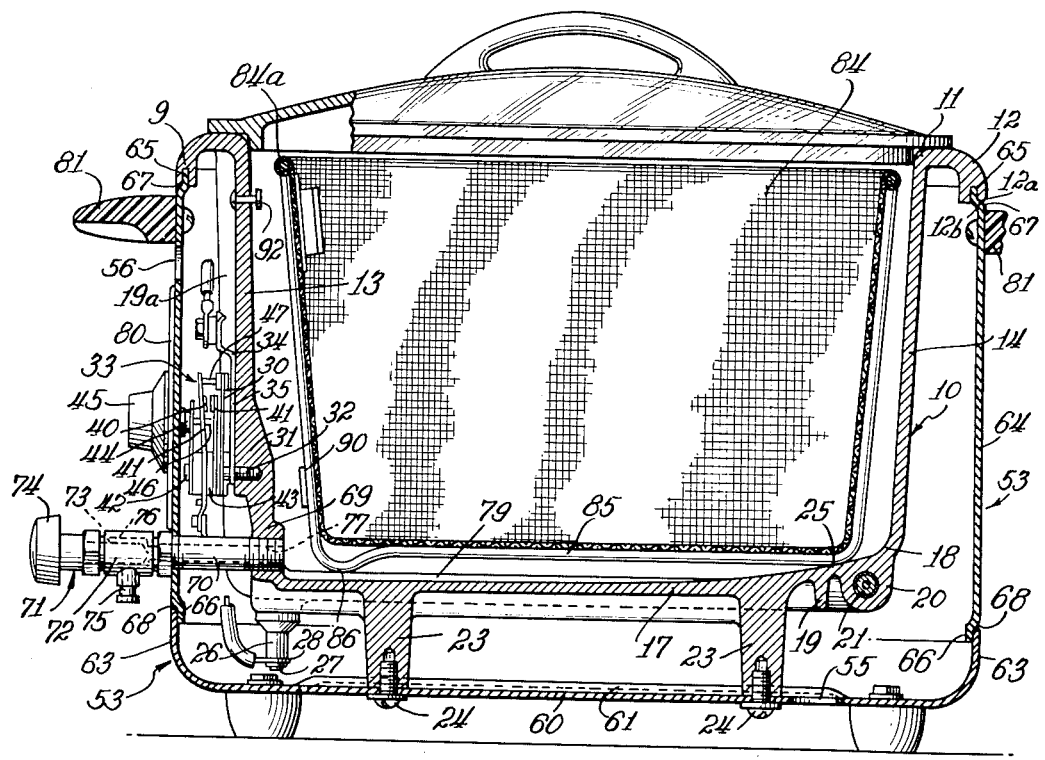
Fig. 2 is an enlarged longitudinal section of the device shown in Fig. 1.
Figure 3:
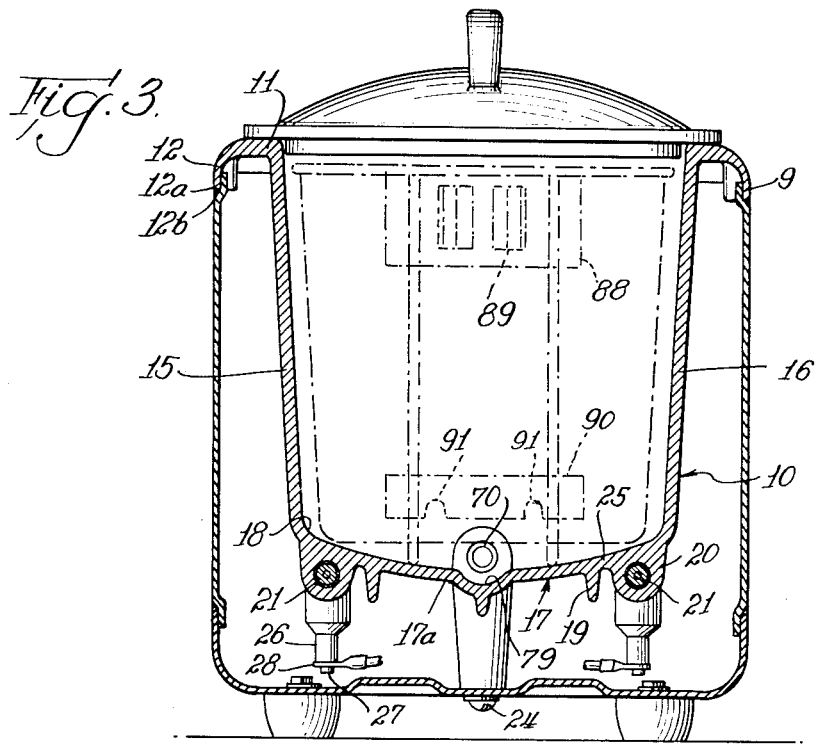
Fig. 3 is an enlarged transverse section of the device shown in Fig. 1.

At their bottom edges the walls join the bottom 17 at corners 18 having a small radius for ease in cleaning. As shown in Figs. 2 and 3, the bottom is bordered upon three sides by a mass of depending metal stock 20 in which is embedded, as when the body is cast, a metal encased unitary heating element 21, referred to very often as a "Cal-rod" or "Mono-rod." The element 21 comprises a metal alloy tubing surrounding a heater element encased in a heat-conducting electrically insulated refractory material.

Figure 7:
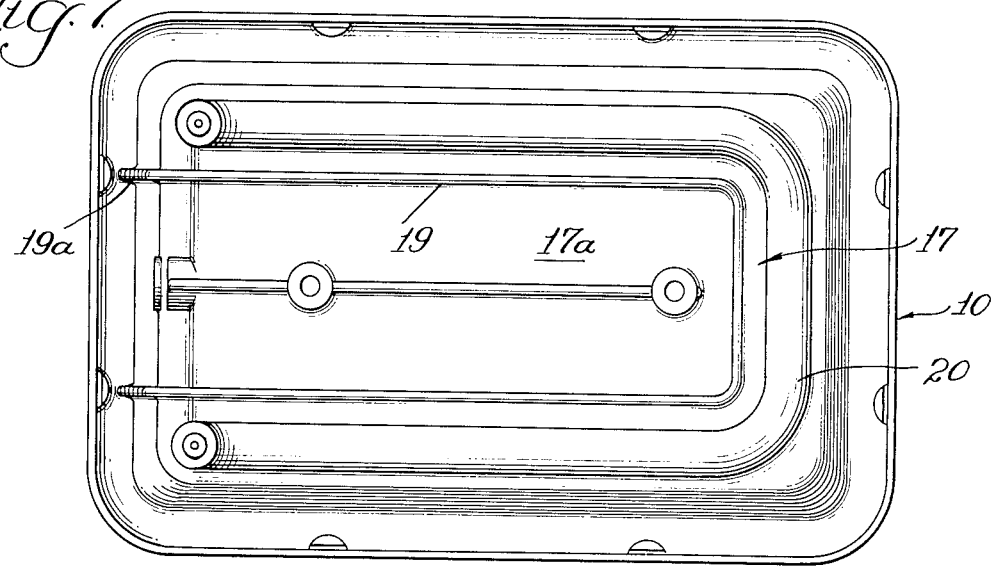
Fig. 7 is a bottom view of the frying well casting embodied in the invention shown in Fig. 1.

The extra stock 20 is preferably provided only on three edges of the bottom. Spaced inwardly from the stock 20 a short distance and connected thereto by a thin web 25 is a depending flange 19 which as shown in Figs. 7 and 8 is coextensive in length with the extra stock 20 and heater 21 to serve as a heat radiating barrier between the central portion 17a of the bottom 17 to prevent any substantial amount of heat from being conducted from the heater 21 to the central portion 17a directly through the metal thereof to pass the flange or fin 19. This permits the central portion 17a to remain cool and subject only to the heat of the fat above it for any heat absorbed by it.

Figure 4:
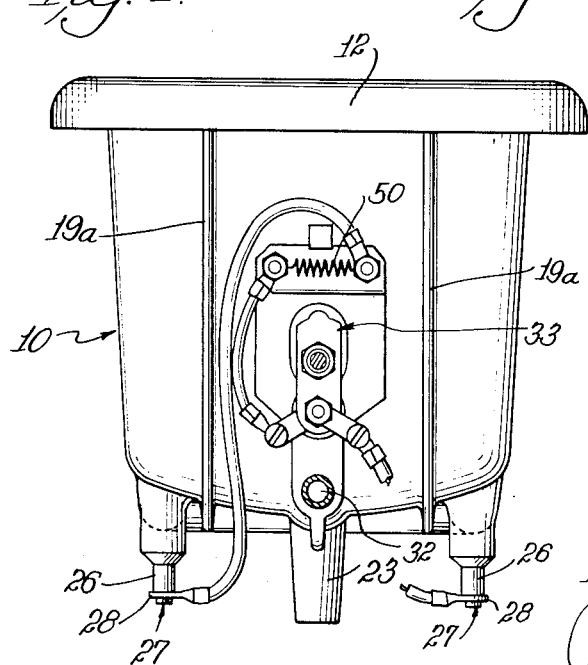
Fig. 4 is an end view of the frying well casting with thermostat mounted in place and the outer shell thereof removed.
Figure 5:
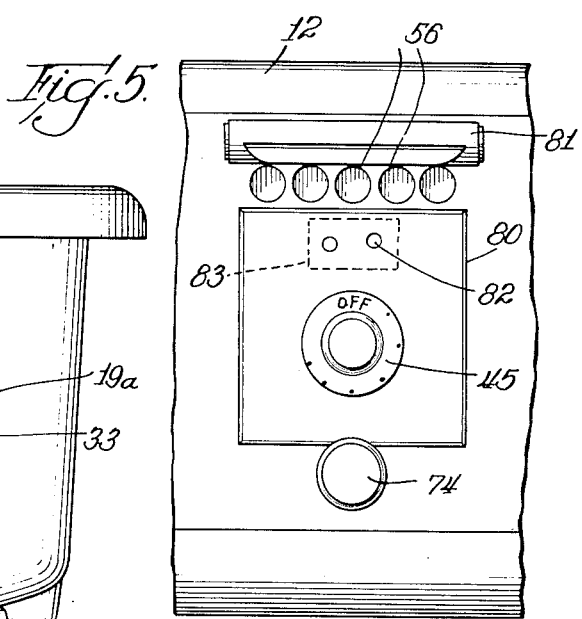
Fig. 5 is a partial end view of the device shown in Fig. 1 illustrating the control panel and elements.

As shown in Fig. 8, further fins 22 may be provided for radiating heat from the bottom central portion 17b (Fig. 10) to induce a cooling effect for the oil or fat immediately adjacent there above within the area bounded by flange 19. Preferably as shown in Fig. 4 the flange 19 at both its ends extends upwardly in the form of 19a on the front end wall 13 of the casting on opposite sides of the thermostat 33 to also shield the wall portion defined thereby and the thermostat thereon from direct conduction of heat from the heater thereto. Further consideration and description of the function and results obtained by the flange 19, 19a and fins 22 will be described further hereinafter.

Bosses 23 extending downwardly from the center of the bottom portion 17a are threaded to receive screws 24 therein employed to hold the assembly together in a manner also hereinafter further described.

Behind the downward-extending portion of the flange 12a recesses or short grooves 9 are cast in the lower face 12b of the edge to receive the upper edges of the vertical walls of the housing as hereinafter described.

Figure 6:
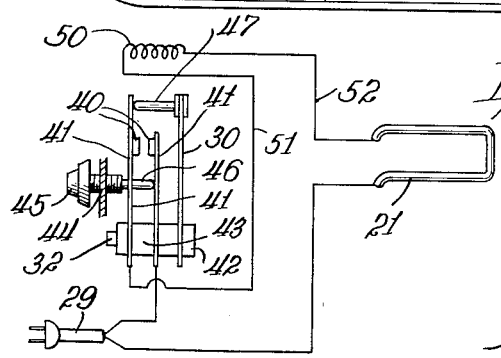
Fig. 6 is a schematic wiring diagram of the embodiment shown in Fig. 1.

The heater means 21 may be plural or singular in its construction or arrangement as already well known but preferably it is U-shaped as shown in the horizontal plane and is bent downwardly as at the ends 26 so that space is saved and the die-forming operation can easily be accomplished. Furthermore, the ends of the electrical element 27 have welded to them binding post eyelet members 28, so that electrical connection can be made as more particularly shown in the schematic diagram in Fig. 6 with the house current through an extension cord 29.

On the outer surface of the wall 13 a boss 31 is provided as part of an elongated draw and is internally threaded to receive a stud 32 upon which is mounted the thermostat switch 33. Preferably the switch elements are carried by a mounting plate 34. The mounting plate has a window 35 through the center portion to determine the area of the wall 13 which is effective upon the bimetal strip 30 in the radiation of heat.

The thermostat comprises two electrical make and break contacts 40 carried by leaf springs 41 clamped together at their base on a sleeve rivet 42 with electrical insulating washers 43 between them. The leaf springs normally urge the contacts 40 to make contact but one of them is adjustably moved away from the other by a hand set control shaft 44 carrying a dial knob 45 having temperature indicia thereon at one end and a di-electric thrust pin 46 engaging the inner one of the springs at the other end. The outer spring is subjected to the deflection of the bimetal member 30 through an intermediate di-electric pin 47 carried by the bimetal member 30.

In one position of the dial knob 45, the inner spring and contact are depressed inwardly far enough to separate the two contacts 40 under all possible conditions, and this position is utilized as the "off" position. When the dial is turned to any other predetermined position registered thereon in temperature readings, the two contacts 40 are permitted to come together as an initial or resting position to close a circuit which includes in series therewith a glow coil 50 mounted above the thermostat and the heater 21, as connected by leads 51 and 52, which leads interconnect, respectively, one contact spring and one end of the glow coil, and the other end of the glow coil and one end of the heater 21. The other spring and the other end of the heater are connected across the house line by the extension cord 29 as already described. In this connection it should be noted that this latter spring which is connected to the house line is preferably the "hot" connection if a polarized plug is used, and this spring is located in the middle of the thermostat assembly for safety reasons.

As will be seen from the drawings, the glow coil 50 is located just above the upper end of the bimetal member 30 and is disposed where its radiation is mainly edgewise to the bimetal member 30, but where its heat effect is essentially confined to the upper portion of the bimetal 30 while the main part of the bimetal is exposed to the window 35 controlled breastwise radiation of heat from the wall 13. The base portion of the bimetal member is shielded from the wall 13 and receives little, if any, radiation from the glow coil 50. Its sensible heat is essentially that which is conducted to it through the stud 32, the sleeve 42, and the intermediate metal elements from the fat present on the opposite side of the center portion of wall 13.

As the temperature of the vessel 10 rises when the contacts 40 are closed, the temperature will approach the temperature set for the vessel by the dial, but in addition to heat conducted to it through the stud, and the heat radiation from the wall of the vessel, the thermostat receives radiant heat from the glow element whose heat is much higher than the vessel wall. This higher heat effect gives an anticipating action to the thermostat. The sum of these three heats causes the thermostat to break contact 40 just before the desired temperature is reached in the vessel, and, after the current is cut off, the higher heat which has been concentrated in the heater itself and not yet dissipated is conducted to the surrounding stock of the vessel, thereby carrying the temperature thereof up to the desired temperature.

When the current is cut off by the thermostat by the opening of the contacts 40, the glow coil 50 cools off and its contribution of radiated heat is lost. The effective cooling of the bimetal will be accelerated ahead of that of the vessel and vessel contents, whereupon the heater is again turned on before the temperature of the vessel falls appreciably from heat loss due to cooking or radiation. This anticipating action of the thermostat is superposed upon the normalizing heat radiation effect which is continually present because of the window controlled radiation from the vessel wall and the heat conduction through the mounting post and sleeve. Thus, over the main upper portion of its body the bimetal member 30 is steadily exposed to radiated heat from the vessel; the mounting end thereof absorbs only heat conducted to it by the metal in the wall from the hot fat on the opposite side of the wall 13, which heat comes into play with substantially no direct conduction of heat from the heater through intermediate wall portions. The free end of the bimetal is exposed to a widely varying heat radiation effect. Flexing in the bimetal adjacent to the mounting stud 32 accomplishes wide movement of the contacts 40 driven thereby, whereas bending near the free end has a minimized effect, thus making it possible to employ a rugged glow coil element 50 at this point for that purpose without delicate adjustments, tolerances or operation.

The housing 53 for the vessel comprises two metal stampings, a bottom member 60 having a closed horizontally disposed central portion offset as at 61 according to a pattern intended to reinforce it against "oil-canning," and apertured to receive the screws 24 which engage in the threaded openings on the vessel bosses 23. In the preferred embodiment ventilation openings 55 are provided adjacent to the back end of the bottom member. At its edges the bottom member is rounded into vertical flanges 63.

The upper member or housing 64 is a rectangularly shaped sheet metal member offset inwardly at its top and bottom edges to provide edges 65 and 66 and shoulders spaced therefrom as at 67 and 68. The edges telescope within the flange 63 and the grooves 9 until the shoulders 67 and 68 come to rest against the edges of the flanges 12 and 63.

The wall 13 of the vessel also has a boss 69 at the bottom thereof at approximately the heater level which is threaded to receive a pipe nipple 70 extending outwardly through the corresponding wall of the intermediate housing member 64. A needle valve 71 is mounted upon the other end of the nipple and comprises a body member 72, a valve stem 73 threaded in the body, a handle 74 on the valve stem, and a drain nozzle 75. The valve compartment 76 and the stem are in axial alignment with the passage 77 through the nipple so that if the passageway or valve ever becomes clogged it can be cleaned out by a straight brush or instrument, and visual inspection can determine whether such is accomplished. The nozzle 75 is press fitted into a side opening disposed normal to the valve compartment 76 and if it becomes clogged it is accessible from both ends for cleaning purposes when the valve is removed.

Although the bottom of the vessel can be so constructed and arranged as to be flat or planar from one side to the other, it is preferred to pitch it slightly from the sides and ends so that sediment and foreign particles will gravitate near the center thereof and the fat more readily drained away through the drain opening 77. A trough 79 is provided to assist in this process and to dispose foreign particles and sediment below the drain opening so that they will not be materially disturbed as the last portion of the fat is drained from the vessel.

To accomplish the draining the location of the valve drain is where the current of convectively circulated cooling fat is downwardly and inwardly towards the center of the vessel. Thus all the particles gravitating in the fat are spread along the bottom of the vessel away from the outlet opening as much as possible. Although the valve is restricted to drainage capacity below that which would cause dislodgement of the solid particles towards the drain opening when draining, the drain opening is appreciably above the bottom so that near the end of the draining operation when only a little fat is left in the trough 79, the vessel can be tipped gradually enough that the last few ounces of fat will flow towards the valve opening without carrying with it the solid particles, yet all but a few drops can be recovered, leaving the solid particles to be wiped out when the vessel is cleaned.

Moreover, the solid particles and sediment settling out of the fat rest upon a cool wall where the heat of the fat is low enough that the particles will not become so scorched as to contaminate the fat either with odors or bad tastes. In this connection as already mentioned, the dial 45 is calibrated for temperature control and appropriate indicia thereon is provided. The upper heat limit preferably is 450° F. in order to prevent the temperature reaching the flash point of any fats or oils possibly used, and the calibration includes 200° F. so that water can be used in the device and kept just below the boiling point for such culinary operations as hardboiling or poaching eggs, etc. A decorative plate 80 supports the dial.

Just above the dial ventilation openings 56 are provided below the handle 81 located at that front end in a position protected from any fat draining into the housing or of any pointed instrument being received therethrough in such a way that it might do damage to the mechanism inside of the housing.

Just above the dial, two openings 82 and a frosted glass pane 83 therebehind are provided in visual alignment with the glow coil 50 so that the user can tell at a glance when the heater is "off" or "on," thus providing visual evidence that the device is fully plugged in and operating, as well as the anticipating control being in operation as already described. Also when the glow goes out the first time after plugging in the device, the user can without guessing or without benefit of a timer, determine that the device is ready for cooking operation.

A screened basket 84 is provided for handling food and is constructed in combination with the vessel 13 so that it can be supported in two positions; one, a cooking position (Figs. 2 and 9) in which it is submerged in the cooking fat, and the other an elevated one so that the fat on the cooked articles will drain back into the vessel.

The screen work upon the basket is conventional, having a wire frame 84 around the top and all mesh joints soldered as by dipping. Two reinforcing wires 85 run from one top end of the basket to the other around the bottom, preferably parallel with each other and offset as at 86 to level the basket in relationship to the slight pitch provided from the back to the front of the bottom. The ends of the reinforcing wires are secured to the wire frame 84 as by soldering or welding.

It will be noted from the respective sectional views that the shape and size of the wire basket is such that it practically fills the entire space of the cooking well except for a reasonable spacing from the sides thereof so that the basket can be raised and lowered without danger of interference or a binding between the basket and vessel. More particularly it is to be noticed as shown in Figs. 3 and 10 that the bottom of the basket is very close to and substantially coextensive with the bottom of the vessel, so that foodstuffs resting in the bottom of the basket will displace fat at the bottom of the vessel and raise the level of the fat sufficiently to cover a maximum load capacity of the basket with minimum requirement of fat.

At one end and secured to the reinforcing wires and wire mesh as disposed on the inside of the basket is a plate 88 having two spaced ears 89 die-stamped inwardly with their free marginal edges bent towards each other to provide included shoulders. A wire handle (not shown) can be provided to cooperate with the ears 89 for handling the basket.

Near the bottom and upon the same end but on the outside of the basket another stamping 90 is rigidly secured to the wires 85 and is formed with notches therein 91 to engage upon suitable pins 92 upon the wall 13 of the vessel in basket-supporting relationship whenever it is desired to drain fat from food which has been cooked before removing it from the basket.

In operation, the vessel is filled about half full with cold cooking fat, the line cord 29 is plugged into a convenience outlet and the dial 45 is turned in clockwise direction from "Off" position to the temperature setting prescribed by the recipe. This closes the contacts 40 and carries the fixed one of contacts to its critical position. The handle is attached to the basket and the basket made ready for use. Visual inspection through the holes 82 will indicate that the heater is in operation because the radiant glow 50 employed for the thermostat can be seen also as light through the opening 82.

Within a few minutes the fat is melted and as the temperature rises the glow coil 50 establishes an anticipating surplus of heat in the bimetal element 30 of the thermostat. This increment of surplus or differential heat is substantially immediately acquired and remains constant when and as long as the glow coil is "on" and is maintained as a differential above the temperature of the vessel.

This temperature differential in the bimetal is directly related to the high heat present in the heater which high heat continues to be expended by the heater for a little while after it is turned "off."

Then when the composite temperature of the thermostat reaches a predetermined point above the actual temperature immediately present in the vessel and in the fat, it will open the circuit on the glow coil and the heater. The initial darkening of the glow coil will inform the user that the fat is ready for cooking and the heater will continue to expend heat and will run out of appreciable excess of heat about the time the temperature of the heater and vessel equals or slightly exceds the desired temperature. However, extra concentration of heat at the two corners and the included end wall 14 where the heating unit is bent will continue a while longer to maintain convective circulation of cool fat against the thermostat wall 13 of the vessel.

Thus, the thermostat wall 13 is the first to begin to be cooled below a predetermined point. However, in the meantime the bimetal is radiating more heat than it is absorbing after the glow coil cools and the slightest fall in temperature of the adjacent vessel wall will be enough to bring the thermostat to its contact closing limit, whereupon the contacts are closed, the heat is turned "on," and the glow coil again readies the bimetal for the upper limit or the next cutoff in the regular cycle. This cycle will repeat itself again and again, maintaining the temperature of the fat within a couple degrees of any desired temperature until the cooking operations are completed.

As the fat leaves the contact with the wall upon which the thermostat is located it passes to the bottom and due to the cooling effect of the central portion 17 of the bottom as protected by the heat barrier flanges 19, the oil will move along the bottom below the basket rearwardly to the back end 14 of the vessel where the heater develops a concentration of heat as already described and will also move gradually up the sides as driven by the heater located in the bottom adjacent the edges thereof, beyond the heat barrier 19.

In the construction shown in Fig. 10 the fins 22 will actually cause some radiation of heat downwardly, which operates to cool the fat adjacent the upper surface of the center portion 17a and thus augment the convective unbalance between the heated fat and the cooled fat, to accelerate the circulation of the oil in the vessel past the thermostat well 13. In this instance air will pass through the openings 55 up and along the fins 22 to the front end of the housing and then up past the thermostat to and out of the openings 56 just above the thermostat. This air passes over the thermostat bimetal but the temperature is approximately the same as otherwise present inside the housing and there will be no loss of uniformity of temperature control. In fact the temperature of the air heated by the fins 22 has a further stabilizing effect for the thermostat in anticipating the lower closing limit of the thermostat. The cooling of the fat accelerates convective circulation to the wall 13 where the thermostat is responsive thereto. In this embodiment a heavy duty device is thus provided as a deep fat fryer for heavy loads.

In this way the fin 19 with the connecting thin portion 23 of the bottom wall 17 between it and the heater boss 20 performs a multiple function in maintaining the center portion of the bottom 17a comparatively cool; accelerating the convective circulation of the fat in the vessel to accomplish fast response of the thermostat control; and makes possible occupancy of the entire well space by the food-carrying basket so that either one of two results, or both, can be obtained, namely, a larger load can be processed at one time with the same amount of fat as used with conventional devices, or, less fat can be employed to process the same size load contemplated in conventional devices. Preferably the device illustrated is designed to take 3 pounds of grease, which is the presently popular size in which fat is packaged. With this amount of grease in it the device will be capable of doing the work generally accomplished by conventional devices that take 3¾ and 4 pounds of fat in them.

Presuming that it is desired to remove the fat, the device is set on an elevated shelf or support, a pan is placed under the valve nozzle 75 and the valve 76 opened. The fat drains, leaving the solid residue, and then the vessel is tilted enough to drain the remaining fat before it cools. Thereafter the residue can be removed with little loss of fat, and the vessel is wiped clean ready for the next use, the interior shape of the vessel being such that it lends itself to ready cleaning.

It will be noted that no fat can drain down inside the housing where it might contact the glow coil or heater ends. The overlap arrangement at the upper edge of the vessel and the housing in both embodiments prevents this. This overlap engagement is maintained tight by the compressive force exerted by the vessel flange 12 downwardly and the upward force exerted and maintained by the screws 24.

A suitable cover 92 can be provided as constructed so that oil collecting on the cover will drain to the edges before falling back into the vessel, thereby minimizing dangers of burns by sputtering oil.

Having thus described the invention and certain embodiments thereof it will be readily apparent to those skilled in the art how the objects mentioned are accomplished and how various and further modifications and changes may be made without departing from the spirit of the invention, the scope of which is commensurate with the appended claims.

What is claimed is:

1. An electric deep fat fryer comprising a cooking vessel for fat formed of a metal of high heat conductivity and having vertical and bottom walls of cast thickness defining a deep cooking space within the vessel, the vessel being of extra thickness at its bottom corners, an electric heater means embedded in said extra thick portion over a major portion of the bottom of the vessel, a plurality of heat radiating fins depending from the bottom, one of which is coextensive with said heating means and is spaced therefrom in a direction towards the center of the bottom by an intermediate thin portion of the bottom constitute a heat barrier for the conduction of heat from the heater through the metal of the bottom of the vessel to the center of the bottom, a thermostat for controlling the operation of said heater mounted on the outside of the vessel in intimate heat exchange relationship therewith on one of said walls, and a housing enclosing the thermostat and all of the vessel but top thereof to protect the vessel and thermostat from ambient atmosphere.

2. The combination called for in claim 1 in which the housing has openings in the bottom portion thereof below said fins and openings near the top edge proximate to said thermostat.

3. An electric deep fat fryer comprising a rectangular deep cooking vessel for fat formed of a metal of high heat conductivity of cast thickness, a unitary electric heater embedded in relatively thick stock bordering the bottom of the vessel adjacent to the vertical walls of the vessel and extending peripherally and with continuity around three contiguous vertical sides of said rectangular vessel, an elongated heat radiating fin depending from the bottom of the vessel and spaced inwardly from the heater by an intervening relatively thin wall section of the bottom, the said fin being coextensive with said heater over the bottom of the vessel to maintain the center of the bottom of the vessel substantially free of heat conducted through the metal from said heater, and a thermostat for controlling the operation of said heater mounted in intimate heat conducting relation on the vertical wall of the fourth side.

4. An electric deep fat fryer comprising a deep cooking vessel for fat, formed of metal of high heat conductivity, electric heating means embedded in the bottom of the vessel adjacent to the vertical wall of the vessel and encompassing a major portion of the bottom peripherally thereof, an elongated heat radiating fin depending from the bottom of the vessel, said fin being spaced inwardly of the heater by a relatively thin wall section of the bottom of the vessel and being coextensive with the heater throughout its length to isolate the center portion of the bottom of the vessel from metal conducted heat from the heater, and a thermostat for controlling the operation of said heater mounted in intimate heat exchange relationship on the heater free portion of the vertical wall.

5. The combination called for in claim 4, in which said fin extends upwardly along said portion of the vertical wall on opposite sides of said thermostat.

6. In an electric deep fat fryer, a casting comprising a cooking vessel for fat formed of a metal of high heat conductivity and having a vertical wall and a bottom wall of cast thickness defining a deep cooking space therein, heater means embedded in the lower extremity of said vertical wall at the juncture of said wall and the bottom wall of the vessel and extending around a major portion of the perimeter of the bottom wall to leave the middle of the bottom wall heater free, the ends of said heater means terminating short of encompassing the bottom wall to leave a substantial but minor portion of the vertical vessel wall free of said heater means, and an elongated heat radiating fin depending from the bottom wall of the vessel adjacent to but spaced inwardly of said heater means and being coextensive with said heater means throughout its length over the bottom of the vessel, the said bottom wall being relatively thin in section on either side of said depending fin to isolate the center portion of the bottom of the vessel from heat conducted thereto from the heater through the metal forming the bottom.

7. An electric deep fat fryer comprising a cooking vessel for fat formed of a metal of high heat conductivity and having a vertical wall of cast thickness defining a deep cooking well having substantially the same horizontal cross-sectional area from top to bottom, the bottom of said well being of extra thickness at its perimeter, a unitary electric heater embedded in said extra thick portion over a major portion of the bottom, an elongated radiating fin continuous over the bottom of the vessel with said heating means and being spaced inwardly therefrom by an intermediate thin portion of the bottom to constitute a heat barrier against the conduction of heat from the heater through the metal of the bottom of the vessel to the center of the bottom, a thermostat for controlling the operation of said heater mounted on the outside of the vessel in intimate heat exchange relationship therewith, and a housing enclosing the thermostat and all of the vessel but the top thereof to protect the vessel and thermostat from ambient atmospheric temperatures.

References Cited in the file of this patent

UNITED STATES PATENTS

| | | |
|---|---|---|
| 1,678,885 | Thomas | July 31, 1928 |
| 2,093,939 | Strack | Sept. 21, 1937 |
| 2,597,695 | Braski | May 20, 1952 |